US009494975B1

(12) United States Patent
Depew et al.

(10) Patent No.: US 9,494,975 B1
(45) Date of Patent: Nov. 15, 2016

(54) ACCESSORY DEVICE IDENTIFICATION METHOD

(75) Inventors: John Mathew Depew, Sunnyvale, CA (US); John Gee Tang, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 340 days.

(21) Appl. No.: 13/073,855

(22) Filed: Mar. 28, 2011

(51) Int. Cl.
*H04B 1/38* (2015.01)
*G06F 1/16* (2006.01)

(52) U.S. Cl.
CPC ......... *G06F 1/1632* (2013.01); *G09G 2380/14* (2013.01)

(58) Field of Classification Search
CPC .................. G06F 1/1632; G06F 1/1656; G06F 15/0291; G09G 2380/14; Y10S 345/901
USPC ..................... 345/173, 169, 901; 361/679.56; 455/557, 556.1, 343.3; 709/228, 248
See application file for complete search history.

(56) References Cited

U.S. PATENT DOCUMENTS

| | | | | |
|---|---|---|---|---|
| 5,534,888 A * | 7/1996 | Lebby et al. | ................. | 345/672 |
| 6,313,828 B1 * | 11/2001 | Chombo | ....................... | 345/169 |
| 6,523,124 B1 * | 2/2003 | Lunsford | ............. | G06F 1/1613 |
| | | | | 713/320 |
| 6,886,036 B1 * | 4/2005 | Santamaki et al. | ........... | 709/223 |
| 7,724,696 B1 * | 5/2010 | Parekh | ......................... | 370/311 |
| 7,966,040 B2 * | 6/2011 | Kim | ..................... | H04M 1/0254 |
| | | | | 455/550.1 |
| 8,047,670 B2 * | 11/2011 | Patrick et al. | .................. | 362/98 |
| 8,140,126 B2 * | 3/2012 | Choi | ...................... | G06F 3/017 |
| | | | | 345/156 |
| 8,402,175 B2 * | 3/2013 | Hwang | ............. | H04M 1/72527 |
| | | | | 327/524 |
| 8,417,292 B2 * | 4/2013 | Kim | ................. | H04M 1/72527 |
| | | | | 455/557 |
| 8,434,685 B1 * | 5/2013 | Lewbel et al. | ................ | 235/454 |
| 8,439,698 B1 * | 5/2013 | Saini et al. | ................... | 439/358 |
| 8,672,228 B1 * | 3/2014 | Saini | ............................. | 235/486 |
| 2002/0169001 A1 * | 11/2002 | Itazawa | ................. | G06F 1/1632 |
| | | | | 455/557 |
| 2003/0069048 A1 * | 4/2003 | Liu | ...................... | H04M 1/6066 |
| | | | | 455/569.1 |
| 2003/0154291 A1 * | 8/2003 | Ocheltree et al. | ............ | 709/228 |
| 2003/0222150 A1 * | 12/2003 | Sato | ...................... | G06F 1/1626 |
| | | | | 235/472.02 |
| 2004/0198442 A1 * | 10/2004 | Chan | ...................... | H01R 24/58 |
| | | | | 455/557 |
| 2004/0229648 A1 * | 11/2004 | Yamamoto | ........ | H04M 1/72527 |
| | | | | 455/557 |
| 2006/0104012 A1 * | 5/2006 | Hsieh et al. | ................... | 361/679 |

(Continued)

*Primary Examiner* — Alina N Boutah
(74) *Attorney, Agent, or Firm* — Lee & Hayes, PLLC (57) ABSTRACT

A portable electronic device may identify an accessory device coupled thereto and its corresponding functionality utilizing a single channel utilized to provide power to the accessory device. Upon establishing a connection between the portable electronic device and the accessory device, the accessory device may transmit a message to the portable electronic device. The message may be decoded in order to identify the specific accessory device connected to the portable electronic device. Subsequently, the portable electronic device may alter its behavior to suit an application or function of the accessory device, thus leading to a more positive user experience.

27 Claims, 5 Drawing Sheets

(56) References Cited

U.S. PATENT DOCUMENTS

| | | | |
|---|---|---|---|
| 2006/0202925 A1* | 9/2006 | Manning et al. | 345/87 |
| 2006/0258400 A1* | 11/2006 | Lee | H04M 1/72527 455/557 |
| 2007/0080935 A1* | 4/2007 | Hanson et al. | 345/156 |
| 2008/0090615 A1* | 4/2008 | Lee et al. | 455/559 |
| 2009/0244009 A1* | 10/2009 | Staats et al. | 345/168 |
| 2010/0075715 A1* | 3/2010 | Jeong | H04M 1/6058 455/557 |
| 2010/0100842 A1* | 4/2010 | Kim | G06F 3/04886 715/808 |
| 2010/0181450 A1* | 7/2010 | Hulick et al. | 248/229.2 |
| 2010/0214925 A1* | 8/2010 | Gormley | 370/235.1 |
| 2010/0262958 A1* | 10/2010 | Clinton et al. | 717/171 |
| 2011/0037428 A1* | 2/2011 | Sakaguchi | G06F 1/1632 320/107 |
| 2011/0044601 A1* | 2/2011 | Lee et al. | 386/219 |
| 2011/0045816 A1* | 2/2011 | Wang et al. | 455/420 |
| 2011/0069475 A1* | 3/2011 | Mish et al. | 362/98 |
| 2011/0098085 A1* | 4/2011 | Stenmark | H04M 1/72527 455/557 |
| 2011/0134600 A1* | 6/2011 | Pine | 361/679.41 |
| 2011/0134643 A1* | 6/2011 | Huang et al. | 362/253 |
| 2011/0161200 A1* | 6/2011 | Carmona et al. | 705/27.1 |
| 2011/0164410 A1* | 7/2011 | Hebenstreit et al. | 362/154 |
| 2011/0167187 A1* | 7/2011 | Crumlin | G06F 1/1626 710/303 |
| 2011/0223968 A1* | 9/2011 | Bunk et al. | 455/556.1 |
| 2011/0238192 A1* | 9/2011 | Shah et al. | 700/94 |
| 2012/0057288 A1* | 3/2012 | Chou et al. | 361/679.09 |
| 2012/0068979 A1* | 3/2012 | Chuang et al. | 345/207 |
| 2012/0072401 A1* | 3/2012 | Johri et al. | 707/705 |
| 2012/0093205 A1* | 4/2012 | Crohas et al. | 375/222 |
| 2012/0140034 A1* | 6/2012 | Tabor | 348/43 |
| 2012/0167232 A1* | 6/2012 | Moosavi et al. | 726/29 |
| 2012/0172088 A1* | 7/2012 | Kirch et al. | 455/557 |
| 2012/0173890 A1* | 7/2012 | Root et al. | 713/300 |
| 2012/0187257 A1* | 7/2012 | Zou | 248/125.8 |
| 2012/0194448 A1* | 8/2012 | Rothkopf | 345/173 |
| 2012/0198101 A1* | 8/2012 | Porcella et al. | 710/12 |
| 2012/0216101 A1* | 8/2012 | Yonemoto | 715/206 |
| 2012/0229974 A1* | 9/2012 | Ting | 361/679.56 |
| 2012/0233677 A1* | 9/2012 | Kowalewski | 726/7 |
| 2012/0240085 A1* | 9/2012 | Sim et al. | 715/864 |
| 2012/0304266 A1* | 11/2012 | Subramaniam et al. | 726/7 |
| 2012/0331100 A1* | 12/2012 | Park | 709/217 |

\* cited by examiner

ACCESSORY DEVICE IDENTIFICATION METHOD

BACKGROUND

Portable electronic devices, such as e-Book readers and MP3 music players, for example, may be associated with accessory devices that perform a variety of different functions. For instance, an accessory device for an e-Book reader may include a cover and an attached reading light that allows a user to better see a display of the e-Book reader in lower lighting conditions. For accessory devices that operate in part by utilizing power from the portable electronic device (e.g., the cover and light described above), the portable electronic device and the accessory device may be connected via an electrical connection (i.e., power channel). Furthermore, in order to enable communication between the portable electronic device and the accessory device, the two devices may connect via a second channel different from the power channel. As a result, the portable electronic device and the accessory device are connected via two channels so that the functionality of the accessory device can be realized. However, the two-channel connection scheme described above may be unfavorable with respect to cost, design, and aesthetics of the portable electronic device and the associated accessory device.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes techniques to enable a portable electronic device to identify the presence and/or the type of an accessory device connected to the portable electronic device via a single accessory-power interface, and without needing a secondary communication-channel connection. By integrating both power and communication into a single channel between the portable electronic device and an associated accessory device, a reduced number of physical connection points (also referred to as "pins") can be used to realize the functionality of both devices. Additionally, reducing the number of pins, such as having a two-pin interface, may be favorable with respect to the cost, design, and/or aesthetics of both the portable electronic device and the accessory device.

In prior solutions, a portable electronic device may either receive power from or provide power to a corresponding accessory device utilizing two connection points (power and ground). However, in order to enable communication between the portable electronic device and the accessory device, a second communication channel would be added, thus resulting in two different connections between the portable electronic device and the accessory device. As a result, both devices are manufactured having ports for each of the power channel and the communication channel, which likely increases manufacturing costs. In addition, having two different connections between the portable electronic device and the accessory device may also complicate the design of such devices. Furthermore, the "look and feel" of either device may be compromised by including additional connection ports to either device.

Therefore, the following disclosure describes systems and techniques for enabling communication between a portable electronic device and an accessory device using an existing power connection (e.g., power port), without needing to include an additional communication channel between the devices. In some embodiments, the existing power connection may be a two-pin interface, in which the portable electronic device and the accessory device are connected at two different points (e.g. power and ground). Upon the accessory device being connected to the portable electronic device via the power port, the portable electronic device is able to identify the specific accessory device and/or functions associated with that accessory device. As a result, this information may be utilized to alter the behavior of the portable electronic device in order to enhance the specific accessory device's application or function. Moreover, since the portable electronic device may be adapted to better suit the functionality of the accessory device, the user may then have a more positive experience while using the portable electronic device.

In further embodiments, the accessory device identification method described above may utilize a modulated power-load technique. More particularly, the accessory device may transmit a unique identifier (ID) payload code to the portable electronic device. Subsequently, a current sensing technique may be utilized by the portable electronic device to identify and decode the data transmission payload transmitted by the accessory device. The decoded data may then be presented to, and processed by, a microcontroller stored on the portable electronic device. As a result, the portable electronic device may utilize the decoded data to identify the specific accessory device coupled thereto. In addition, the foregoing data transmission may occur when the accessory device is initially connected to the portable electronic device (i.e., powered on) or at any other time when the portable electronic device and the corresponding accessory device are coupled to one another.

The discussion begins with a section, entitled "Architectural Environment," describing a system for coupling a portable electronic device to an accessory device utilizing a single connection. Next, the discussion includes a section, entitled "Example Accessory Device Identification Techniques," that describes a system for identifying an accessory device coupled to a portable electronic device utilizing a single connection. The discussion then moves on to an "Example Portable Electronic Device" section that illustrates an example portable electronic device in the form of an e-Book reader device. The discussion then includes a section, entitled "Illustrative Methods," that illustrates and describes example processes for implementing the described techniques. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

Figure 1:
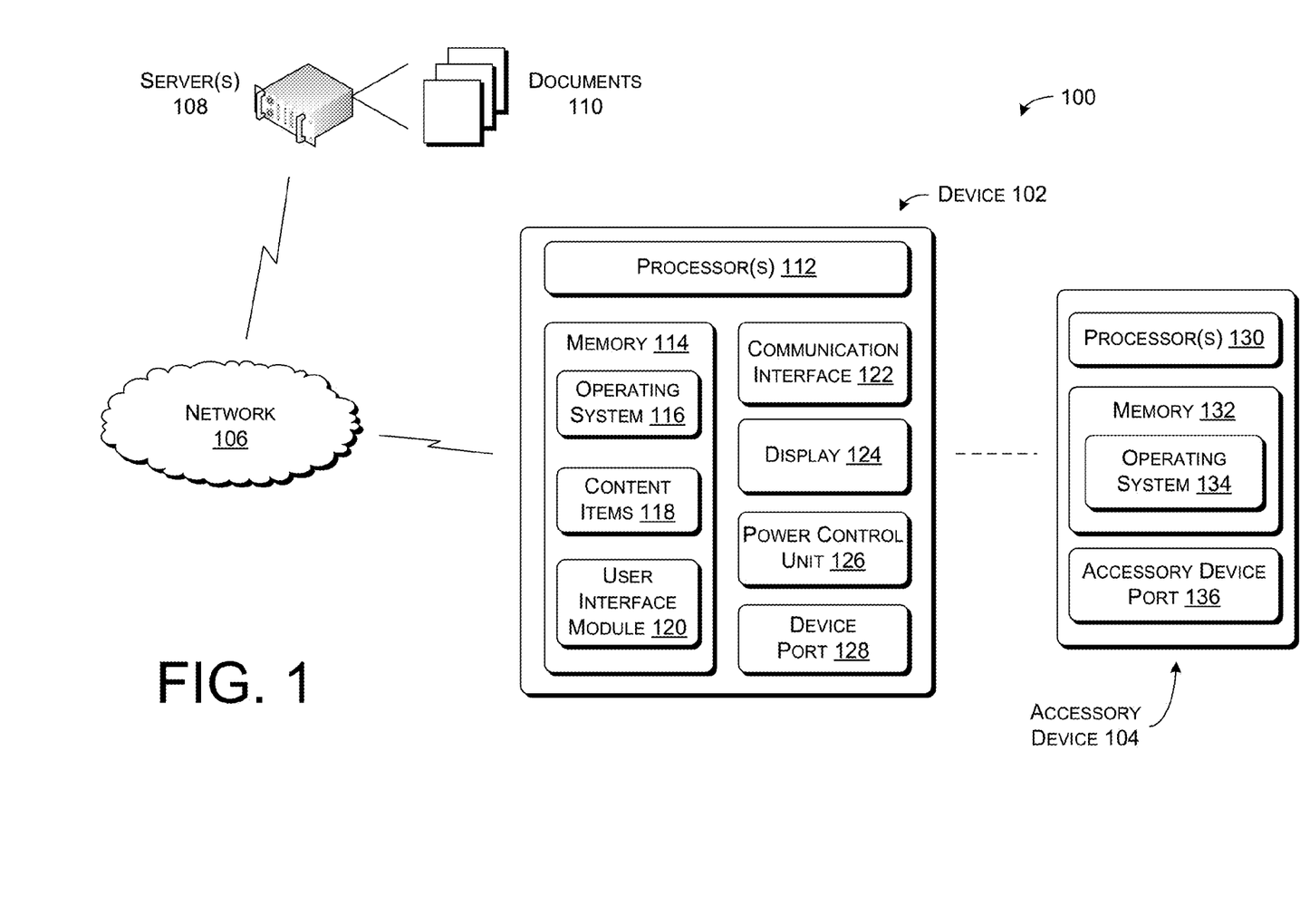
FIG. 1 is a diagram showing an example system including a device, an accessory device, a network, and one or more servers. In this system, functionality of the device and the accessory device may be realized utilizing a single connection.

FIG. 1 illustrates an example system 100 for communicating information between an accessory device and a host device utilizing a power port. More particularly, the system 100 includes a device 102, an accessory device 104, a network 106, one or more server(s) 108, and documents 110 associated with the server(s) 108. In various embodiments, the device 102 includes one or more processor(s) 112, a memory 114, which includes an operating system 116, one or more content items 118, and a user interface module 120, a communication interface 122, a display 124, a power control unit 126, and a device port 128. Furthermore, the accessory device 104 includes one or more processor(s) 130, a memory 132, which includes an operating system 134, and an accessory device port 136.

In various embodiments, the device 102 may be any type of electronic device, such as a portable electronic device (e.g., e-Book reader device, MP3 music player, mobile telephone, etc.). A user may utilize the device 102 to perform a variety of functions, such as reading an e-Book, listening to MP3 music files, and/or accessing the network 106 to access or download documents 110 (e.g., e-Books, MP3 music files, etc.) stored on the server(s) 108. In various embodiments, the device 102 may be interchangeably referred to as "host device" or "portable electronic device."

The accessory device 104 may couple to the device 102 in order to enhance the functionality of the device 102 and/or to add features associated with the device 102. For instance, the accessory device 104 may be a book cover that connects to the device 102 and prevents the device 102 from becoming damaged. Additionally, the accessory device 104 may include a reading light that, when coupled to the device 102, allows the reader to better view text displayed on the device 102. The accessory device 104 may also include a speaker, a microphone, storage, or any other feature that functions in conjunction with the device 102. However, the foregoing examples are not exhaustive and the accessory device 104 may be any type of device that is compatible with the device 102. Moreover, in some embodiments, the accessory device 104 may also access and/or retrieve documents 110 (e.g., e-Books, MP3 music files, etc.) stored on the server(s) 108 via the network 106.

In different embodiments, and as will be described in additional detail below, the accessory device 104 may connect to the device 102 utilizing a single channel. For instance, the device 102 and the accessory device 104 may utilize a two-pin interface in which the two devices are connected by two points (power and ground). In various embodiments, the two-pin interface may allow the device 102 to supply power to the accessory device 104, and vice versa, and may allow the device 102 and the accessory device 104 to communicate with one another. Consequently, the device 102 is able to both supply power to the accessory device 104 and identify the presence and type of accessory device 104 utilizing a single channel (e.g., power port), without needing an additional, different connection between the device 102 and the accessory device 104. For the purposes of this discussion, the terms channel, port, and connection may be used interchangeably and may represent some type of mechanism that enables the device 102 and the accessory device 104 to be coupled to one another.

In some embodiments, the network 106 may be any type of network known in the art, such as the Internet, private networks, and the like. Moreover, the device 102 and/or the accessory device 104 may communicatively couple to the network 106 in any manner, such as by a wired or wireless connection. Further, the server(s) 108 may be any type of server known in the art, such as a web server. The server(s) 108 may store one or more of the documents 110, which may include documents accessible via the Internet. In various embodiments, the documents 110 may include media content, such as e-Books or MP3 music files, and/or any other type of content known in the art.

As stated above, the device 102 may include one or more processor(s) 112. In at least one configuration, the processor(s) 112 may execute one or more modules and/or processes to cause the device 102 to perform a variety of functions. In some embodiments, the processor(s) 112 may include a central processing unit (CPU), a graphics processing unit (GPU), both CPU and GPU, or other processing units or components known in the art. In various embodiments, CPU and/or GPU may be interchangeably referred to as a microcontroller. Additionally, each of the processor(s) 112 may possess its own local memory, which also may store program modules, program data, and/or one or more operating systems.

Furthermore, the memory 114 may store the operating system 116, the content items 118, and the user interface module 120. Depending on the exact configuration and type of the device 102, the memory 114 may include volatile memory (such as RAM), non-volatile memory (such as ROM, flash memory, miniature hard drive, memory card, or the like), or some combination thereof. The memory 114 may include one or more program modules and/or program data.

The memory 114 may be used to store any number of functional components that are executable on the processor(s) 112, as well as data that are rendered by the device 102. For example, the memory 114 may store the operating system 116, one or more content items 118, such as e-Books, and the user interface module 120. The memory 114 may further include a memory portion designated as an immediate page memory to temporarily store one or more pages of an e-Book. The pages held by the immediate page memory are placed therein a short period before a next page request is expected.

The term "page," as used herein, refers to a collection of content that is presented at one time in the display 124 of the device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

The content items 118 stored in the memory 114 may include any type of content that is renderable by the device 102. For instance, the content items may include electronic content, such as e-Books or MP3 music files, for example. The terms "book" and/or "e-Book", as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or e-Book may include any visual content that is in electronic or digital form.

The user interface module 120 may also be provided in the memory 114 and executed on the processor(s) 112 to facilitate user operation of the device 102. The user interface module 120 may provide menus and other navigational tools to facilitate selection and rendering of the content items 118. The user interface module 120 may further include a browser or other application that facilitates access to sites over the network 106, such as websites or online merchants.

The device 102 may also have additional input device(s), such as a keyboard, a mouse, a pen, a voice input device, a touch input device, etc. Output device(s), such as the display 124, speakers, a printer, etc., may also be included. A user may utilize the foregoing features to interact with the device 102, the network 106, and/or the server(s) 108. For instance, the user may use the device 102 to order the content items 118 via the network 106 and to render the content items 118 via the display 124. Moreover, in various embodiments, the communication interface 122 may allow the device 102 to communicate and/or interface with the network 106 and/or one or more devices, such as the accessory device 104 and/or the server(s) 108.

In additional embodiments, the device 102 may be equipped with a display 124 (e.g., an electronic display) to display the content items 118, such as e-Books. In one embodiments, the display 124 may use e-Paper display technology, which is bi-stable, meaning that it is capable of holding text or other rendered images even when very little or no power is supplied to the display 124. The display 124 may also be a reflective display without a backlight that is illuminated by ambient light sources external to the display 124. Some exemplary displays 124 that may be used with the embodiments described herein may include bi-stable LCDs, MEMS, cholesteric, pigmented electrophoretic, and others. The display 124 may also be embodied using other technologies, such as LCDs and OLEDs. In some implementations, the display 124 may further include a touch screen interface.

Furthermore, the power control unit 126 may provide electrical power from a battery or from any external source, such as a power cord. The power control unit 126 may operatively control an amount of power, or electrical energy, consumed by the device 102. Actively controlling the amount of power consumed by the device 102 may achieve more efficient use of electrical energy stored by a battery. In some implementations, power from the power control unit 126 may be provided to the accessory device 104 when the device 102 and the accessory device 104 couple to one another. The power control unit 126 may further include a clock/timer for accurate control of power consumed by the device 102.

In example embodiments, the device 102 may include a device port 128. The device port 128 may be utilized to couple the device 102 to the accessory device 104 or any other devices. Further, the device port 128 may comprise a multi-pin interface (e.g., two pins, etc.) in which the device 102 is connected to the accessory device 104 via multiple points (e.g., via a pin that provides a power connection and a pin that provides a ground connection). Not only can the device port 128 provide power to the accessory device 104, but the device port 128 may also enable the device 102 to communicate with the accessory device 104. For instance, at any time when the device 102 is coupled to the accessory device 104, the device 102 may identify the specific accessory device 104 coupled thereto. As a result, the device 102 may modify its behavior based on the corresponding accessory device 104.

The device 102 may have additional features and/or functionality. For example, the device 102 may also include additional data storage devices (removable and/or non-removable) such as, for example, magnetic disks, optical disks, or tape. Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, or other data. The memory 114, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the device 102. Any such computer storage media may be part of the device 102. Moreover, the computer-readable media may include computer-executable instructions that, when executed by the processor(s) 112, perform various functions and/or operations described herein.

Rather, communication media may embody computer-readable instructions, data structures, program modules, or other data in a modulated data signal, such as a carrier wave, or other transmission mechanism, for example. In various embodiments, computer storage media, as described above, is distinct from communication media.

As stated above, the accessory device 104 may include one or more processor(s) 130. In at least one configuration, the processor(s) 130 may execute one or more modules and/or processes to cause the accessory device 104 to perform a variety of functions. In some embodiments, the processor(s) 130 may include a CPU, a GPU, both CPU and GPU, or other processing units or components known in the art (e.g., a microcontroller). Additionally, each of the processor(s) 130 may possess its own local memory, which also may store program modules, program data, and/or one or more operating systems. Furthermore, the memory 132 may include the operating system 134, which may run various programs stored in the memory 132 of the accessory device 104.

The accessory device 104 may further include an accessory device port 136, which allows for the accessory device 104 to be connected to the device 102. In various embodiments, via the accessory device port 136, the device 102 may supply power to the accessory device 104. Moreover, connection of the device 102 to the accessory device 104 through the accessory device port 136 may enable the accessory device 104 to transmit one or more messages to the device 102. In some embodiments, such messages may inform the device 102 that a particular accessory device 104 is coupled thereto. Moreover, the messages may identify the accessory device 104 and or functionality associated with that accessory device 104.

In various embodiments, although the device 102 and the accessory device 104 are shown to include multiple components (e.g., processor(s) 112 and 130, memory 114 and 132, communication interface 122, etc.), the device 102 and the accessory device 104 may include all, some, including any combination thereof, or none of the foregoing components. For instance, some accessory devices 104 may not include a processor 130, an operating system 134, etc., and may instead include circuitry to perform operations associated with a functionality of the device 102 and/or the accessory device 104.

Example Accessory Device Identification Techniques

Figure 2:
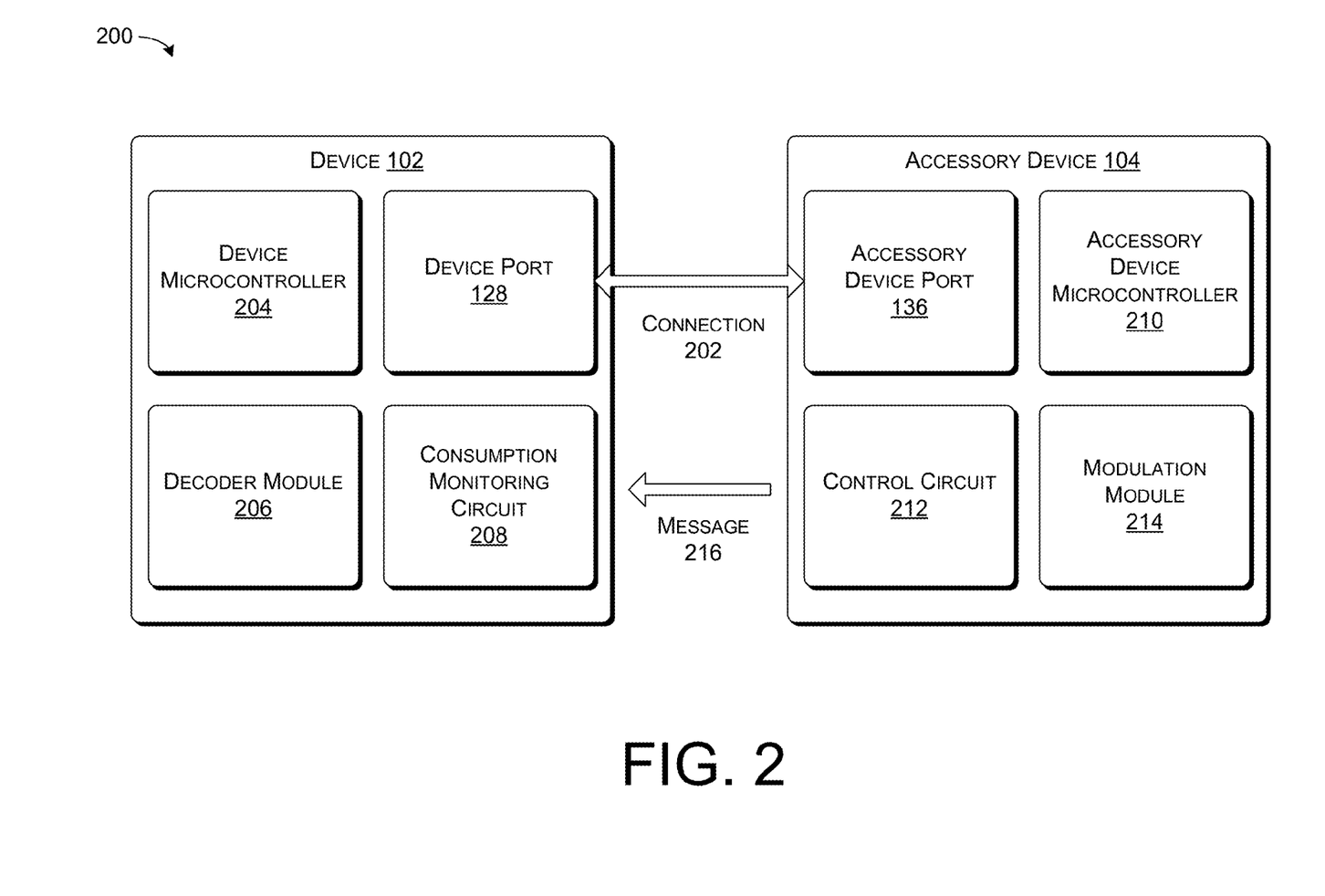
FIG. 2 is a diagram showing an example system of enabling power and communication between a device and an accessory device utilizing a single connection.

FIG. 2 illustrates an example system 200 for utilizing a power port to enable communication between a device and a corresponding accessory device. More particularly, the system 200 includes a device 102 and an accessory device 104. Furthermore, the device 102 includes a device microcontroller 204, a device port 128, a decoder module 206, and a consumption monitoring circuit 208. Additionally, the accessory device 104 includes an accessory device port 136, an accessory device microcontroller 210, a control circuit 212, and a modulation module 214. Moreover, a connection 202 may be established between the device 102 and the accessory device 104 and a message 216 may be transmitted from the accessory device 104 to the device 102. In further embodiments, the device 102 and the accessory device 104, as illustrated in FIG. 2, correspond to the device 102 and accessory device 104, respectively, that are depicted in FIG. 1. That is, the device 102 and the accessory device 104 may comprise a portable electronic device and an accessory device that is compatible therewith.

In various embodiments, described herein is an accessory device identification method in which the device 102 may sense the presence of and identify the accessory device 104 that is coupled thereto. More particularly, upon the accessory device 104 being coupled to the device 102, the device 102 and the accessory device 104 may exchange communications with one another utilizing a single channel that is also utilized for powering the accessory device 104 and/or communicating data from and to the accessory device 104. In these embodiments, such communication may occur using a single channel without the need for an additional connection that is typically utilized for communication between two devices. As a result, a single connection may be utilized to realize the functionality of both the device 102 and the corresponding accessory device 104.

In some embodiments, the accessory device identification method described herein may be initiated when the accessory device 104 is initially coupled to the device 102. Alternatively, the identification method may occur at any time when the device 102 and the accessory device 104 are connected to one another. Regardless, the accessory device 104 may utilize a modulated power-load technique to transmit the message 216 to the device 102. The device 102 may utilize a current sensing technique to identify and decode the message 216 and then transmit the message 216 to the device microcontroller 204, which may correspond to a processing unit of the device 102. Subsequently, the device microcontroller 204 may process the message 216 so that the device 102 is able to modify its behavior to suit that particular accessory device 104. For instance, by identifying the exact accessory device 104 coupled to the device 102 and/or the accessory device's 104 corresponding function(s), the device 102 may change its behavior to accommodate and enhance the application or function of the accessory device 104. That is, the device 102 may change its behavior by modifying the way the device 102 operates, such as by presenting different display screens that allow a user to interact with the accessory device 104.

In various embodiments, the accessory device 104 may connect to the device 102 from the accessory device port 136 to the device port 128. This coupling may occur by a user physically connecting the accessory device 104 to the device 102. As stated above, the accessory device 104 may be connected to the device 102 utilizing a single connection, thus allowing the device 102 to supply power to the accessory device 104 and enabling the two devices to communicate with one another. Furthermore, upon the accessory device 104 being connected to the device 102, the accessory device microcontroller 210 and/or the control circuit 212 may become active. In these embodiments, the accessory device 104 may not have power until it is coupled to the device 102. However, in other embodiments, the accessory device 104 may have power, via a battery or otherwise, prior to being connected to the device 102.

Once the accessory device microcontroller 210 becomes active, either immediately after the accessory device 104 is coupled to the device 102 or at a later time, the accessory device microcontroller 210 may initiate control over the control circuit 212. Utilizing the control circuit 212, the accessory device microcontroller 210 may then modulate a load (e.g., payload), which may refer to data and/or information that identifies a source and destination of material to be transmitted to the device 102. In various embodiments, the modulation is performed by the modulation module 214 and the load may be modulated/manipulated in such a way that a coded signal (i.e., the message 216) is transmitted to the device 102.

In various embodiments, the modulation module 214 may be a dedicated module or a collection of components that operates in response to a trigger. For instance, provided that the accessory device 104 is an e-Book cover with a reading light, upon the reading light being actuated by a user (e.g., the trigger), the modulation module 214 may cause the payload to be modulated. However, any type of trigger (e.g., activating the accessory device 104, coupling the accessory device 104 to the device 102, etc.) may cause the modulation module 214 to modulate the payload. Moreover, the message 216 may be transmitted to the device 102 utilizing the connection 202 and may include information that identifies the accessory device 104 and/or functions associated with the accessory device 104. The message 216 may be used by the device 102 to determine the presence and identification of that particular accessory device 104.

Since the accessory device 104 may perform different functions, the accessory device 104 may communicate with the device 102 so that these functions can be realized. Initially, provided that the accessory device 104 is dependent upon power from the device 102, the accessory device 104 may first reset and become activated (e.g., turn on and power up). For instance, assume that the device 102 and the accessory device 104 are an e-Book reader device and an e-Book cover (with an attached reading light), respectively. In order to realize the functionality of the e-Book cover, a connection 202 is established between the e-Book cover and the e-Book reader device utilizing the device port 128 and the accessory device port 136. Upon establishing the connection 202, the accessory device microcontroller 210 and the control circuit 212 of the e-Book cover may become active. As a result, the accessory device microcontroller 210 may run the logic that causes the accessory device microcontroller 210 to modulate a load utilizing the modulation module 214. In other words, the accessory device microcontroller 210 may run logic that causes the e-Book cover to consume a modulated load based at least in part on the control circuit 212 within the e-Book cover.

In various embodiments, the load may be uniquely modulated such that a message 216 is transmitted from the e-Book cover to the e-Book reader device utilizing a single connection 202 between the devices. As stated above, the message 216 may inform the e-Book reader device than an e-Book cover is coupled to the e-Book reader device and/or specifically identify the e-Book cover. The message 216 may also optionally identify functionality associated with the e-Book cover (e.g., that the e-Book cover serves as a reading light, etc.). That is, the message 216 may include any type of information relating to the accessory device 104, such as information identifying the accessory device 104 itself, a family of accessory devices 104, or a user associated with the accessory device 104, for example. As a result, the message 216 transmitted from the e-Book cover may enable the e-Book reader device to adapt its own behavior or functionality based at least in part on the coupled e-Book cover.

With respect to the device 102, the message 216 transmitted by the accessory device 104 may be received via the device port 128. In various embodiments, the operations of the device 102 may be controlled by the device microcontroller 204, which may correspond to a processing unit of the device 102. Further, the consumption monitoring circuit 208 of the device 102 may monitor a current consumption of the device 102, such as by monitoring power consumption of the accessory device 104 or any other functionality associated with the device 102. The consumption monitoring circuit 208 may be incorporated in the device 102 in order to monitor the amount of current entering and exiting the device 102 and to prevent an excessive amount of current from hindering performance of the device 102 (i.e., preventing a short, etc.).

In some embodiments, the device microcontroller 204 may monitor a particular point in the consumption monitoring circuit 208 so that the voltage at the consumption monitoring circuit 208 can be compared to the amount of current that is entering or exiting the device 102. By monitoring the current at the consumption monitoring circuit 208, possibly by monitoring a particular point in the consumption monitoring circuit 208, the consumption monitoring circuit 208 may identify when the message 216 is transmitted to the device 102 from the accessory device 104. As a result, the device 102 may recognize when it receives the message 216 from the accessory device 104. The message 216 may then be decoded by the decoder module 206 and the decoded information may be presented to the device microcontroller 204. Based at least in part on this information, the device 102 may identify the particular accessory device 104 and thereby alter the behavior of the device 102 based on the type of accessory device 104 and its corresponding functionality.

Utilizing the example described above, based on the current being monitored at the consumption monitoring circuit 208, the e-Book reader device may determine that the message 216 has been received from the e-Book cover. As a result, the decoder module 206 of the e-Book reader device may decode the message 216 and send the decoded message or information derived from the message 216 to the device microcontroller 204. The e-Book reader device may then, based on this information, alter its behavior to enhance the functionality of both the e-Book reader device and the e-Book cover. For example, the e-Book reader device may display a screen allowing a user to operate the e-Book cover reading light.

As described above, the device 102 may change its behavior when the device 102 becomes aware of an accessory device 104 that is coupled thereto. The way in which the device 102 operates may depend on a type of the corresponding accessory device 104 and how that particular accessory device 104 functions. In some embodiments, the accessory device 104 may enhance an application of the device 102. For instance, an example accessory device 104 may provide an FM radio compatible transmission for audio listening within a vehicle. By attaching this accessory device 104 to the device 102, the accessory device identification method described above may cause software associated with the device 102 to divert its audio output to the appropriate interface without the need for user intervention. That is, the device 102 may begin outputting an FM radio transmission by simply connecting the accessory device 104 to the device 102. Upon removal of the accessory device 104, the device 102 may, without user intervention, revert back to the settings the device 102 was utilizing prior to being connected to the accessory device 104. Consequently, the device 102 may be configured to adapt to each accessory device 104 without the need for a user to perform some operation in addition to connecting the accessory device 104 to the device 102.

The accessory device identification scheme may also apply to accessory devices 104 having wireless communication capabilities. With respect to wireless communication, a Media Access Control (MAC) address may refer to a unique identifier that is used for communication between two devices. Therefore, in order for the device 102 to wirelessly communicate with the accessory device 104, a MAC address assigned to the accessory device 104 should be transmitted to the device 102. In some embodiments, the MAC address may be included in the message 216 transmitted to the device 102. For instance, assume that a particular accessory device 104 is associated with a wireless keyboard. When the accessory device 104 is connected to the device 102, the MAC address is transmitted to the device 102 such that the device 102 may become aware that there is a wireless keyboard associated with the accessory device 104. As a result, the device 102 may adapt so that it can receive commands wirelessly from the wireless keyboard without user intervention. Therefore, once the user couples the accessory device 104 to the device 102, the user may begin operating the device 102 by submitting keystrokes on the wireless keyboard.

Another example may relate to home audio. For instance, provided that the accessory device 104 is a docking station ("dock") that is capable of wirelessly connecting to audio speakers within the home, a user may connect the device 102 to the dock. Utilizing the power port, which is also utilized for communication between the device 102 and the dock, the device 102 may determine that the device 102 is now connected to the dock. The device may then recognize that the dock is associated with wireless audio speakers and connect to such speakers via a wireless connection. As a result, the device 102 may be configured to render content via the audio speakers despite limited involvement of the user (i.e., connecting the device 102 to the dock).

In other embodiments, the device 102 and the accessory device 104 may utilize the server(s) 108 to exchange information with one another. For instance, the device 102 may pass information (e.g., content items 118, etc.) to the server(s) 108 via the network 106. Subsequently, the accessory device 104 may then retrieve or receive this information from the server(s) 108 by way of the network 106. Likewise, the accessory device 104 may upload information to the server(s) 108 for receipt by the device 102. The information described above may be any type of information, such as digital content, identifying information, functionality associated with either the device 102 or the accessory device 104, etc. In various embodiments, the information may be used to enable communication between the devices via a single connection.

In some embodiments, in addition to identifying the accessory device 104 based on the message 216 transmitted to the device 102, the device 102 may identify the accessory device 104 in a different manner. For instance, the device 102 may identify the accessory device 104 based on the means in which the accessory device 104 is coupled to the device 102. In various embodiments, the identification could be made based on a depth in which a plug associated with the accessory device 104 is inserted into the device port 128 of the device 102. That is, different accessory devices 104 may have corresponding plugs that extend a certain distance into the device 102. Therefore, the device 102 may be able to identify a particular accessory device 104 based on how far the plug extends into the device 102. Furthermore, the accessory device 104 may also be identified based on a bar code, a color, a pattern, or any other features that uniquely represents a particular accessory device 104 and, therefore, enables the device 102 to identify that particular accessory device 102.

In different embodiments, information representative of a particular accessory device 104 may be communicated based on a ball and spring mechanism. More particularly, the device port 128 associated with device 102 may include a spring and each accessory device 104 may be equipped with a ball, or vice versa, that compresses the spring when the accessory device 104 is connected to the device 102. For instance, a degree to which the ball is compressed and/or a tension of the spring may indicate that a specific accessory device 104 is connected to the device 102. Moreover, the compression and/or tension of the ball-spring mechanism may vary depending on the type of accessory device 104 being connected to the device 102, thereby allowing the device 102 to identify which accessory device 104 is being coupled thereto.

Therefore, the accessory device identification techniques described herein allow a portable electronic device to determine the presence and identification of an accessory device utilizing a single connection. That is, the connection, such as the two-pin interface described above, enables the portable electronic device to both supply power to the accessory device and communicate with the accessory device. In various embodiments, the identification may result from a modulated load being transmitted from the accessory device and subsequently decoded by the portable electronic device. Accordingly, the portable electronic device may use a single connection to utilize the functionality of the accessory device. Moreover, the portable electronic device may alter its behavior based on the specific accessory device that is coupled thereto, thus leading to reduced costs of designing and manufacturing the portable electronic device and a more positive user experience.

It is further contemplated that the foregoing systems and techniques are not limited to the embodiments described above and may be utilized in any other context known in the art.

Example Portable Electronic Device

Figure 3:
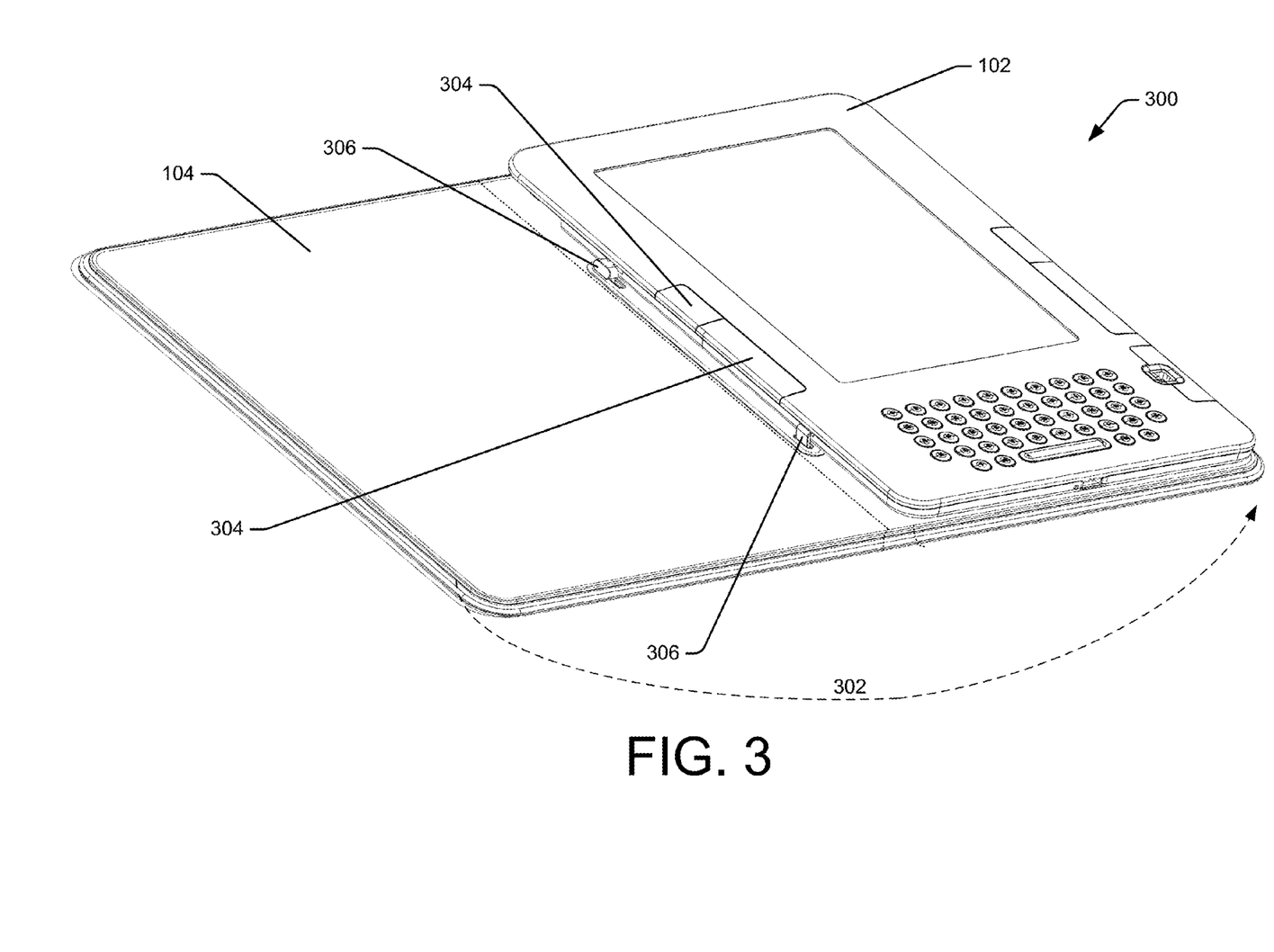
FIG. 3 is a diagram showing an example device that is coupled to an accessory device utilizing a single connection.

FIG. 3 illustrates an example system 300 showing a portable electronic device and a corresponding accessory device. Although the portable electronic device 102 may be any type of device, FIG. 3 illustrates an e-Book reader device. FIG. 3 further illustrates that the e-Book reader device is coupled to an accessory device 104, which is depicted as an e-Book cover. As shown, the e-Book reader device and the corresponding e-Book cover are displayed in a flat open configuration. Moreover, folding a front cover of the e-Book cover along arrow 302 places the e-Book cover in a closed configuration, which may protect the e-Book reader device from being damaged. In the open configuration, a user may have unobstructed access to buttons 304 that are disposed along the perimeter of the e-Book reader device. The user may utilize the buttons 304 in order to interact and/or operate with the e-Book reader device.

Moreover, adjacent to the buttons 304 are connection ports 306. In various embodiments, both the e-Book reader device and the e-Book cover may possess connection ports 306 (e.g., device port 128 and accessory device port 136, respectively) that enable the e-Book cover to be coupled to the e-Book reader device. Moreover, the connection ports 306 may be used to supply power to the e-Book cover, provided that the e-Book cover includes a reading light, a display screen, or some other feature of the e-Book cover that operates utilizing electrical power. The connection ports 306 may also be utilized for communication between the e-Book reader device and the e-Book cover, as described above with respect to FIGS. 1 and 2. For instance, upon the e-Book cover being connected to the e-Book reader device, the e-Book reader device may determine the presence and identification of the e-Book cover. As a result, by utilizing a single connection (e.g., the two-pin interface described above), the e-Book reader device may adapt its behavior based on the specific e-Book cover that is attached via the connection ports 306.

Moreover, as shown in FIG. 3, the connection ports 306 are located on the edge, or spine, of the e-Book reader device. However, the connection ports 306 may be located on any portion of the e-Book reader device. In some embodiments, depending upon the type and/or functionality of the accessory device 104, it may be advantageous to locate the connection ports 306 in a position other than the edge of the e-Book reader device. For instance, with respect to an accessory device 104 having a reading light, it may be preferable to situate the connection ports 306 adjacent to the display of the e-Book reader device, thus allowing the reading light to be in close proximity to the display.

Example Methods

Figure 4:
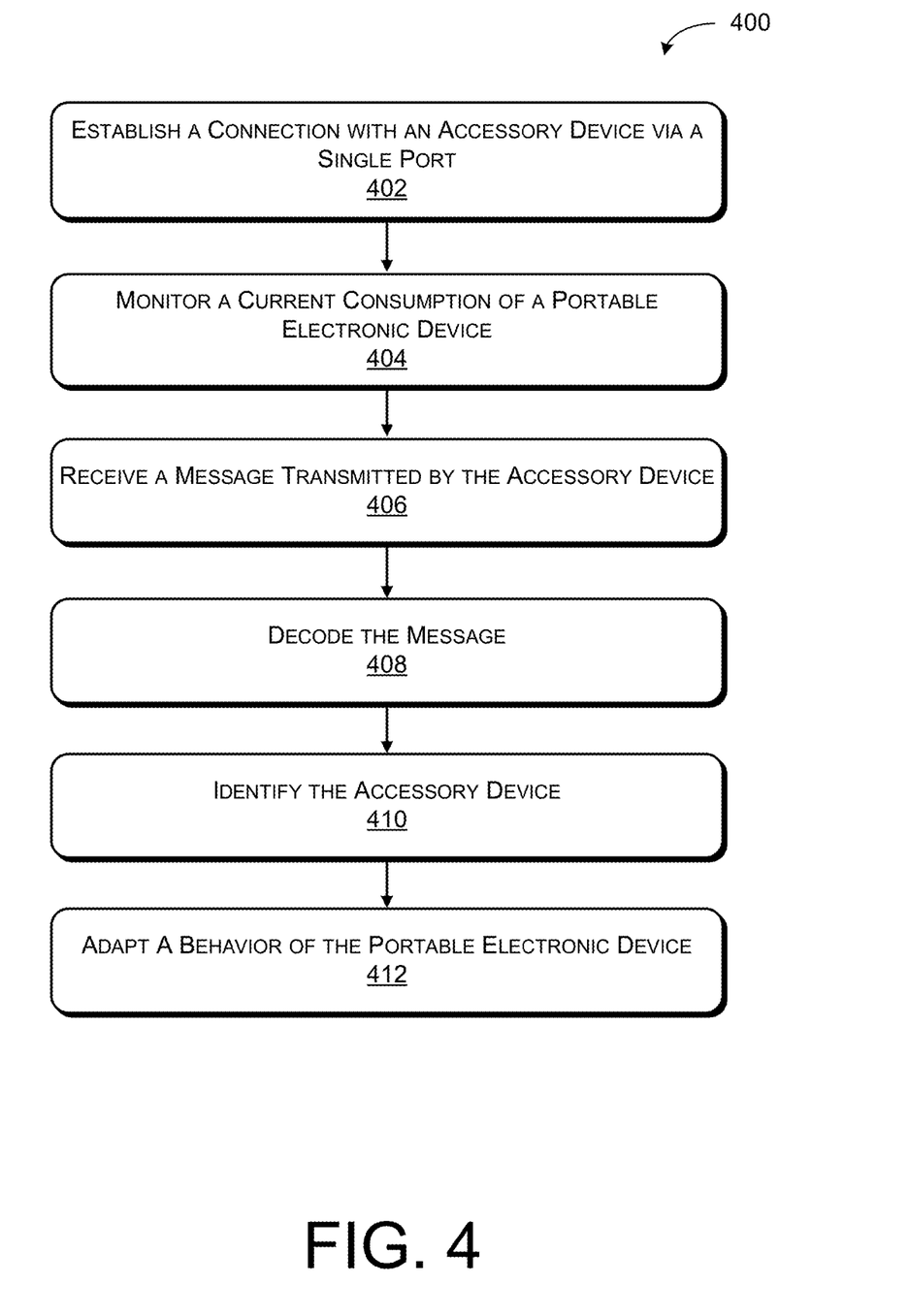
FIG. 4 is a flow diagram showing an example process of identifying an accessory device utilizing a single connection.
Figure 5:
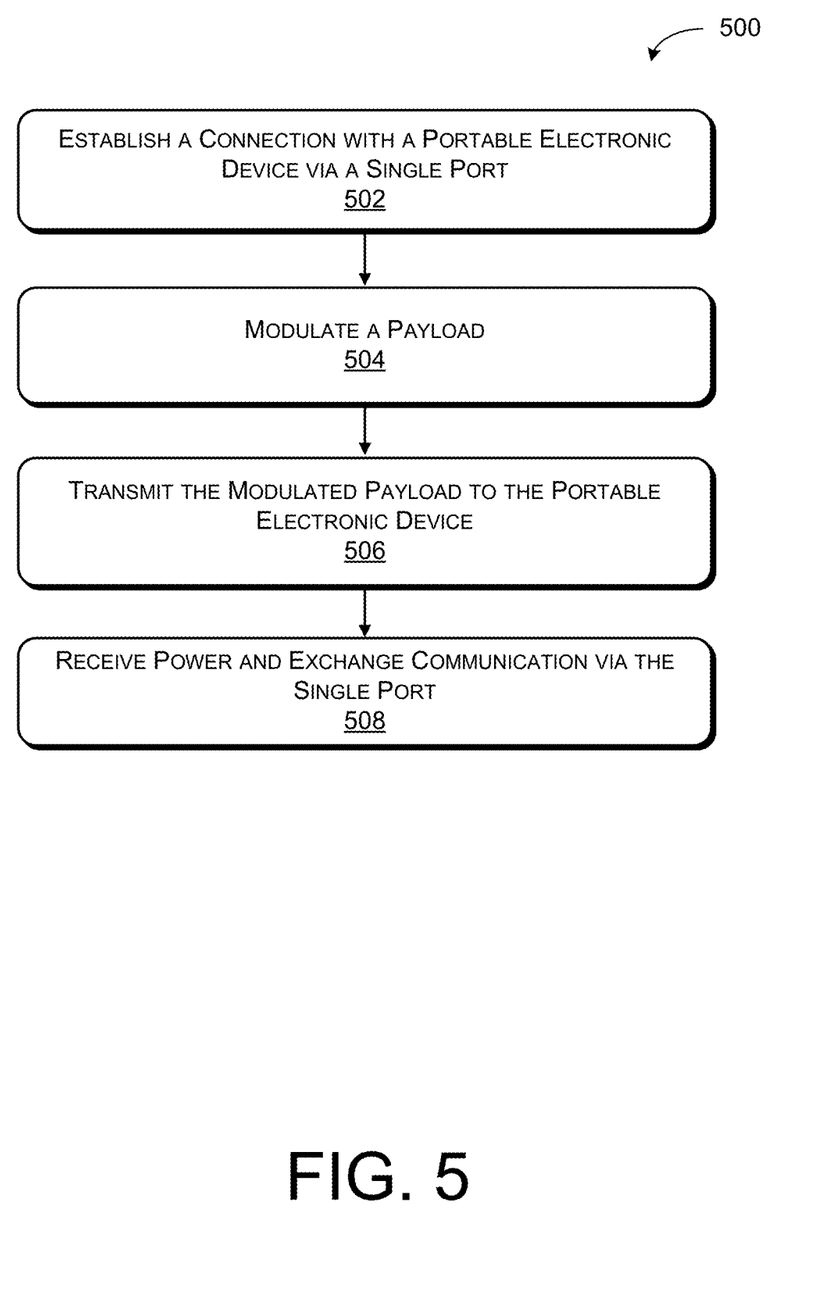
FIG. 5 is a flow diagram showing an example process of receiving power from and exchanging communication with a portable electronic device.

FIGS. 4 and 5 describe various example methods of enabling a portable electronic device to identify an accessory device via a single power connection. The example methods are described in the context of the environment of FIGS. 1-3, but are not limited to those environments. The order in which the operations are described in each example method is not intended to be construed as a limitation, and any number of the described blocks can be combined in any order and/or in parallel to implement each method. Moreover, the blocks in FIGS. 4 and 5 may be operations that can be implemented in hardware, software, or a combination thereof. In the context of software, the blocks represent computer-executable instructions stored in one or more computer-readable storage media that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flow diagram illustrating an example method of identifying an accessory device and adapting a behavior of a portable electronic device utilizing a single connection. In various embodiments, the operations set forth in FIG. 4 may be performed by a portable electronic device, such as device 102, for example. In particular, block 402 illustrates establishing a connection with an accessory device via a single port. In some embodiments, the connection may be established by physically coupling the portable electronic device to the accessory device. Moreover, the single port may enable the portable electronic device to provide power to, and exchange communication with, the accessory device without needing an additional communication channel. For instance, the single port may comprise a multi-pin interface in which the portable electronic device and the accessory device are connected by a first point (e.g., for power) and a second point (e.g., a ground).

Block 404 illustrates monitoring a current consumption of a portable electronic device. In some embodiments, a consumption monitoring circuit may be monitored by a microcontroller of the portable electronic device to determine an amount of current that is entering and exiting the portable electronic device. More particularly, a certain point in the consumption monitoring circuit may be monitored to determine whether the portable electronic device receives a communication from the accessory device.

Block 406 illustrates receiving a message transmitted by the accessory device. In some embodiments, the message may be identified by monitoring the consumption monitoring circuit. Moreover, the message may include any type of information associated with the accessory device and, more particularly, the message may include a modulated payload transmitted by the accessory device. The modulated payload may also be encoded such that the portable electronic device may decode the message.

Block 408 illustrates decoding the message. In some embodiments, upon receiving the message from the accessory device, a decoder module of the portable electronic device may decode the message. The decoded message may then be presented to a microcontroller of the portable electronic device for further processing.

Block 410 illustrates identifying the accessory device. More particularly, in response to receiving the decoded message, the microcontroller of the portable electronic device may process the decoded message. The decoded message may contain a sufficient amount of information to enable the portable electronic device to identify the accessory device and/or a functionality of the accessory device. That is, the portable electronic device may identify the specific accessory device coupled thereto via a single connection (e.g., single port) between the portable electronic device and the accessory device.

Block 412 illustrates adapting a behavior of the portable electronic device. In particular, based at least in part on an identity of the accessory device and a functionality of the accessory device, the portable electronic device may modify its behavior so that the portable electronic device functions efficiently with the accessory device, which may create a more positive user experience. For instance, the portable electronic device may modify its behavior in a manner that best suits the functionality of the accessory device. Therefore, the portable electronic device may both provide power to and identify a corresponding accessory device utilizing a single connection.

FIG. 5 is a flow diagram illustrating an example method of receiving power from, and establishing communication with, a portable electronic device utilizing a single port. In some embodiments, the operations illustrated in FIG. 5 may be performed by an accessory device, such as accessory device 104, as shown in FIGS. 1-3. More particularly, block 502 illustrates establishing a connection with a portable electronic device via a single port. In some embodiments, the accessory device may be physically coupled to the portable electronic device utilizing a single connection. This connection may subsequently be used by the accessory device to receive power from the portable electronic device and to transmit a message to the portable electronic device.

Block 504 illustrates modulating a payload. In some embodiments, the payload may correspond to information that identifies the accessory the device and/or a functionality of the accessory device. Additionally, the payload may be modulated by a modulation module of the accessory device.

Block 506 illustrates transmitting the modulated payload to the portable electronic device. Once the payload is modulated, the modulated payload may be transmitted to the portable electronic device utilizing the connection between the portable electronic device and the accessory device. The modulated payload may include information that allows the portable electronic device to determine the identity of the accessory device and functionality that is performed by the accessory device.

Block 508 illustrates receiving power and exchanging communication via the single port. In various embodiments, in response to receiving the modulated payload, the portable electronic device may subsequently determine an identity of the accessory device. In addition, the portable electronic device may also determine functionality associated with the accessory device. As a result, the portable electronic device may provide power to the accessory device and enable communication between the two devices using a single connection. Therefore, the accessory device may receive power so that the accessory device can perform various operations in conjunction with the portable electronic device. The accessory device may also utilize the single connection to exchange communication with the portable electronic device, which may enhance a performance of the portable electronic device and the accessory device.

Utilizing the foregoing systems and/or techniques, a portable electronic device can identify a particular accessory device coupled to the portable electronic device using a single connection. In addition, the portable electronic device may also determine a functionality associated with the accessory device. Utilizing this information, the portable electronic device may adapt or modify its behavior so that the portable electronic device and the accessory device function in a cooperative manner. As a result, the user may receive an enhanced user experience. Furthermore, limiting the portable electronic device to a single port to perform the foregoing operations may be favorable with respect to costs associated with, and a design of, the portable electronic device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic book (eBook) reader device, comprising:
a connection port configured to facilitate a power channel between the eBook reader device and an accessory device, the power channel enabling the eBook reader device to provide power to, and to exchange communication with, the accessory device;
a circuit configured to identify a modulation of a load of the power channel;
a decoder module configured to decode the modulation into a decoded message; and
a microcontroller configured to:
process the decoded message to determine, from multiple types of connections associated with the connection port, a type of connection between the connection port of the eBook reader device and the accessory device, the type of connection being utilized to determine a functionality of the accessory device; and
alter, based at least in part on the functionality of the accessory device, a behavior of the eBook reader device.

2. The eBook reader device as recited in claim 1, wherein the decoded message corresponds to an identifier code associated with the functionality of the accessory device.

3. The eBook reader device as recited in claim 1, wherein the microcontroller is further configured to alter the behavior of the eBook reader device without user intervention other than coupling the accessory device to the connection port.

4. The eBook reader device as recited in claim 1, wherein the power channel comprises a power connection point and a ground connection point, and wherein the eBook reader device utilizes the power connection point to provide power to the accessory device and utilizes at least one of the power connection point and the ground connection point to identify the modulation of the load of the power channel.

5. The eBook reader device as recited in claim 4, wherein the connection port comprises a multi-pin interface, and wherein the power connection point and the ground connection point each correspond to a pin included in the multi-pin interface.

6. The eBook reader device as recited in claim 1, wherein the accessory device comprises an eBook cover.

7. The eBook reader device as recited in claim 1, wherein identifying the modulation of the load of the power channel comprises identifying a modulation of an amount of current entering and exiting the eBook reader device via the power channel.

8. The eBook reader device as recited in claim 1, wherein the type of connection corresponds to a depth in which a connector associated with the accessory device extends into the connection port of the eBook reader device.

9. An accessory device, comprising:
a port configured to facilitate a power channel between the accessory device and a portable electronic device, the power channel transmitting power between the accessory device and the portable electronic device; and
a modulation module to modulate a power load consumed by the accessory device, the power load consumed being modulated based at least in part on an identifier that corresponds to information that determines, from multiple types of associated with the port, a type of connection between the port of the accessory device and the portable electronic device, the type of connection indicating a functionality performed by the accessory device.

10. The accessory device as recited in claim 9, wherein upon establishing a connection to the portable electronic device, the accessory device receives the power from the portable electronic device via the power channel.

11. The accessory device as recited in claim 9, wherein modulating the power load comprises modulating an amount of power consumed by the accessory device according to an identifier code that identifies the accessory device.

12. The accessory device as recited in claim 9, wherein a message is transmitted in response to a connection being established between the accessory device and the portable electronic device.

13. A method comprising:
under control of a portable electronic device configured with specific executable instructions,
establishing a connection with an accessory device utilizing a single port that includes a power channel for enabling a transfer of power between the portable electronic device and accessory device;
determining a modulation of power load of the accessory device;
determining, based at least in part on the modulation, a type of the connection between the single port of the portable electronic device and the accessory device; and
determining an identity or a functionality of the accessory device based at least in part on the type of the connection.

14. The method as recited in claim 13, further comprising:
monitoring a power consumption of the portable electronic device; and
wherein determining the modulation of the power load comprises determining a modulation of an amount of power consumed by the electronic device based at least in part on the monitoring.

15. The method as recited in claim 13, further comprising:
adapting a behavior of the portable electronic device to enhance a performance of the electronic portable device based at least in part on the functionality of the accessory device.

16. The method as recited in claim 13, wherein:
the single port comprises a multi-pin interface having at least two physical connection points; and
wherein the power channel is facilitated by a power pin and a ground pin included in the multi-pin interface.

17. The method as recited in claim 13, wherein:
the portable electronic device is an eBook reader device; and
the accessory device enhances a functionality of the eBook reader device.

18. A method comprising:
under control of an accessory device configured with specific executable instructions,
receiving an indication of a connection between the accessory device and a portable electronic device established via a single port that includes a power channel configured to transmit power between the accessory device and the portable electronic device; and
modulating a power load of the accessory device based at least in part upon a functionality associated with the accessory device.

19. The method as recited in claim 18, wherein the power channel is configured to receive power from the portable electronic device and to enable communication between the portable electronic device and the accessory device.

20. The method as recited in claim 18, wherein modulating the power load of the accessory device comprises modulating an amount of power consumed by the accessory device.

21. The method as recited in claim 18, wherein the modulating the power load occurs at any time subsequent to establishing the connection between the accessory device and the portable electronic device.

22. Non-transitory computer-readable media including computer-executable instructions that, when executed by one or more processors, cause the one or more processors to perform operations comprising:
- determining a modulation of a power load consumed by an accessory device via a power channel configured to transmit power between the accessory device and a portable electronic device;
- determining an identity and a functionality of the accessory device based at least in part on the modulation of the power load consumed by the accessory device; and
- modifying a behavior of the portable electronic device based at least in part on the identity and the functionality of the accessory device.

23. The non-transitory computer-readable media as recited in claim 22, wherein the behavior of the portable electronic device is modified to enable at least one of a functionality of the portable electronic device and the functionality of the accessory device.

24. The non-transitory computer-readable media as recited in claim 22, wherein determining the identity and the functionality of the accessory device includes decoding the modulation of the power load consumed by the accessory device.

25. The non-transitory computer-readable media as recited in claim 22, wherein determining the modulation of the power load consumed by the accessory device includes monitoring a current entering and exiting the portable electronic device.

26. The non-transitory computer-readable media as recited in claim 22, wherein the power channel is:
- between the portable electronic device and the accessory device;
- configured to provide power to the accessory device; and
- configured to enable communication between the portable electronic device and the accessory device.

27. The non-transitory computer-readable media as recited in claim 22, wherein the operations further comprise determining whether the modulation of the power load consumed by the accessory device has been received at least partly in response to establishing a connection between the portable electronic device and the accessory device via a single port.

* * * * *